United States Patent [19]
Bennett

[11] 3,889,958
[45] June 17, 1975

[54] PISTON ROD FLOATING WIPER
[75] Inventor: Milton C. Bennett, Moline, Ill.
[73] Assignee: J. I. Case Company, Racine, Wis.
[22] Filed: Apr. 15, 1974
[21] Appl. No.: 461,252

[52] U.S. Cl. ................ 277/24; 277/174; 277/194; 277/195
[51] Int. Cl.² .......................................... F16J 15/16
[58] Field of Search ............ 277/24, 154, 165, 199, 277/195, 194, 188, 173, 174

[56] References Cited
UNITED STATES PATENTS

| | | | |
|---|---|---|---|
| 2,935,365 | 5/1960 | Dega | 277/188 |
| 3,272,520 | 9/1966 | Woolfenden | 277/165 |
| 3,608,913 | 9/1971 | D'Assignies | 277/165 |
| 3,642,290 | 2/1972 | Millsap | 277/24 |

Primary Examiner—Richard E. Aegerter
Assistant Examiner—L. Footland
Attorney, Agent, or Firm—Arthur J. Hansmann

[57] ABSTRACT

A rod wiper for use in a fluid cylinder assembly having a cylinder and a piston rod and a housing member included in the assembly and having an annular opening adjacent the rod. Two wiper ring members are disposed in the annular opening in a nested arrangement, and the radially inner one of the members is movable relative to the other one and it engages the rod for the wiping action. An elastic type of O-ring is disposed between the two ring members and permits the inner ring member to move radially with deflection of the rod and thereby remain snug with the rod and be efficient in its wiping action.

5 Claims, 5 Drawing Figures

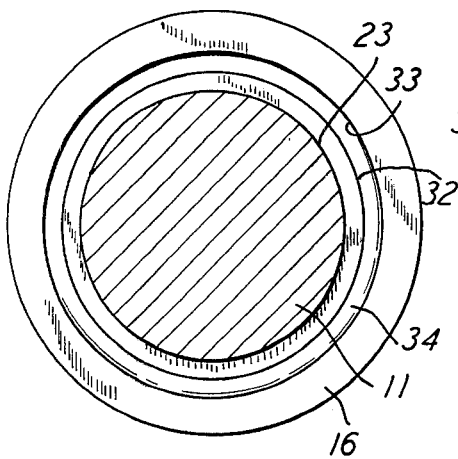
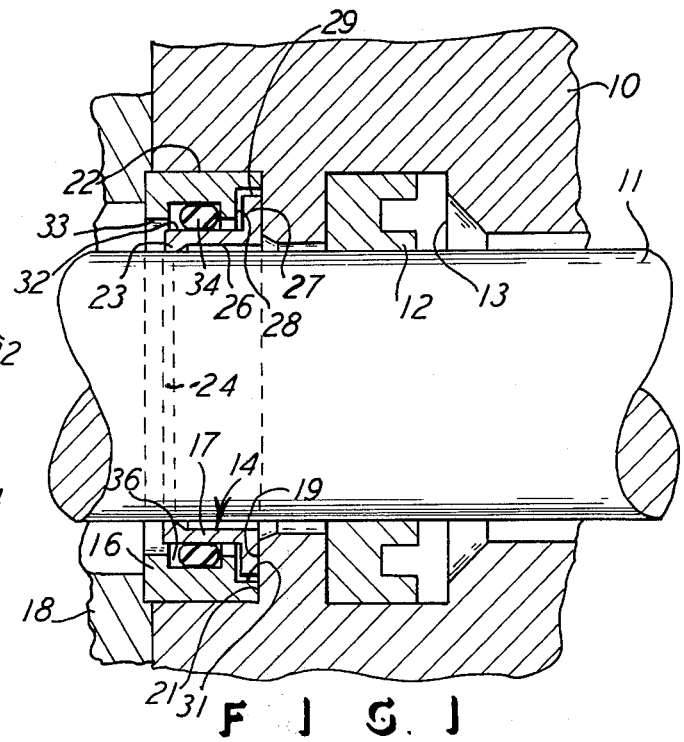
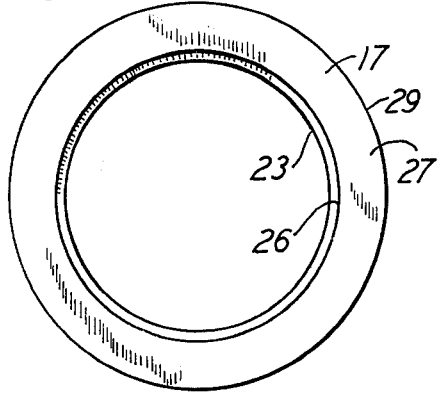
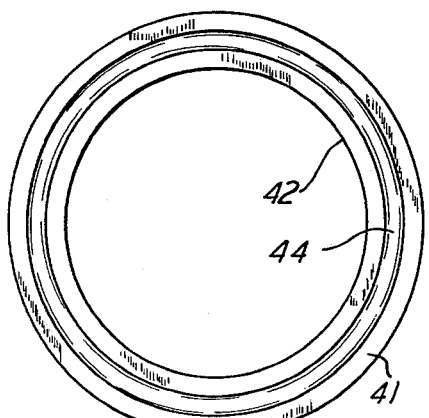
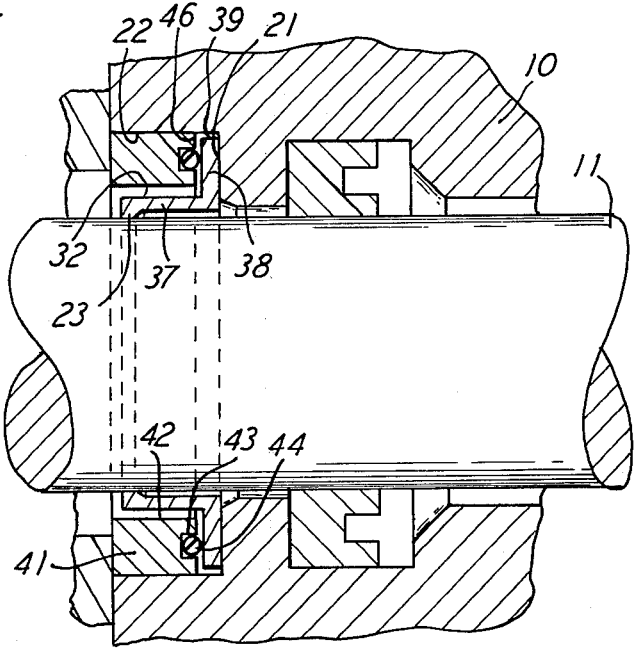

3,889,958

PISTON ROD FLOATING WIPER

This invention relates to a rod wiper for use in a fluid cylinder assembly, and, more particularly, it relates to a rod wiper which is capable of moving radially in response to the deflection of the piston rod, and thereby remain in snug contact with the rod for efficient wiping action.

BACKGROUND OF THE INVENTION

The prior art already contains many disclosures of arrangements for piston rod wipers in hydraulic cylinder assemblies. These wipers commonly exist in the configuration of rings which encircle the axially movable piston rod and engage the circumference of the rod for wiping the rod and thereby keeping dirt and the like from entering the cylinder. Further, various means are provided for positioning the ring-shaped wiper to have it remain snug with the rod. One such example is seen in U.S. Pat. No. 3,179,423.

However, in prior art wipers, the arrangement is such that either the wiper is of a soft material which responds to the deflection of the piston rod and which then may stretch or retain a deformed shape so that the wiper is no longer efficient, and a gap may actually exist between the wiper and the rod and thus dirt can enter the cylinder. Also, prior art wipers are inadequate in that where they are made of a hard and non-deformable material, they tend to scratch and score the piston rod and thus again provide openings for the entry of dirt into the hydraulic cylinder.

To improve upon the prior art, the present inventive construction utilizes a wiper which will move along with the deflection of the piston rod and yet remain snug with the rod, without receiving a permanent deformed shape or without scoring the rod. That is, the wiper of this invention permits free axial movement of the piston rod and also permits lateral or deflected movement of the rod, and in all instances the wiper remains snug with the rod to preclude the entry of dirt into the cylinder. Further, with the construction of the several pieces constituting the wiper of this invention, the wiper is provided with a lip which is in contact with the piston rod, and the lip may actually be of a suitable plastic material, steel, brass, or the like, and in all instances it will snugly and efficiently contact the rod but without damaging the rod and without permitting the passage of dirt into the cylinder.

Still further, it is the advantage and object of this invention to provide a wiper assembly which can be readily and easily installed, and which can even be replaced, relative to the piston rod and the cylinder itself, and the wiper is provided with a lip which will be readily and easily positioned in snug contact with the circumference of the piston rod itself.

Still further, it is an object of this invention to provide a piston rod wiper assembly which is self-adjusting in the radial direction of the rod, and which thereby remains snug with the rod in all deflected positions of the rod, and the wiper is restricted or limited in its movement axially of the rod, all for efficiently precluding the entry of dirt and like foreign matter into the cylinder itself. In accomplishing this object, the wiper has its lip in contact with the piston rod, and the lip is movable in response to the deflection of the rod, and yet there is not damaging load which can be applied to the lip, such as the load created by the deflection of the rod, since the wiper assembly is provided with a floating ring member encircling the rod and being readily movable with the deflection of the rod.

Other objects and advantages have become apparent upon reading the following disclosure in light of the accompanying drawings.

BRIEF DESCRIPTION OF THE DRAWINGS

FIG. 1 is a longitudinal sectional view through one embodiment of this invention, and showing a fragment of a cylinder and rod assembly.

FIG. 2 is an end elevational view of a portion of FIG. 1.

FIG. 3 is an end elevational view of the inner ring member shown in FIG. 1, and taken from the right hand end thereof as seen in FIG. 1.

FIG. 4 is a view similar to FIG. 1 but showing another embodiment of the wiper assembly.

FIG. 5 is an end view of the outer ring shown in FIG. 4, and being a view from the right hand end as seen in FIG. 4.

DETAILED DESCRIPTION OF THE PREFERRED EMBODIMENTS

The drawings show a fluid cylinder assembly having a cylinder 10, which is fragmentarily shown, and a piston rod 11 extends into the cylinder 10 and is axially slidable therein. It will of course be understood that the rod 11 is suitably supported in the cylinder 10 by means of a conventional bearing which is not shown but which anyone skilled in the art will be aware of and understand the assembly. The right hand end of the cylinder 10, as viewed in FIG. 1, will be toward the pressure side of the cylinder, in the usual manner, and a fluid seal, such as the shown seal 12, is disposed in an opening 13 in the cylinder for preventing the escape of fluid pressure to the left, as viewed in FIG. 1.

It will be further noted that the piston rod 11 has some radial clearance with the cylinder 10, and thus the rod 11 can bend or deflect or move transverse to its longitudinal axis, that is up and down as seen in FIG. 1. It is this particular movement which is of concern with regard to providing for and having the function of a rod wiper which keeps external contaminants or dirt from entering the cylinder 10.

In this instance, a wiper assembly 14 is disclosed, and it includes an outer ring member 16 and an inner member ring 17, and the rings 16 and 17 are substantially nested together, as shown in FIG. 1. The outer ring member 16 is fixedly secured to the cylinder 10, and a retainer 18 may be fastened to the cylinder 10, or it may be pressed in, for holding the ring 16 from outward axial movement, and the cylinder 10 is shown to have a bore 19 which receives the wiper assembly 14. The cylinder 10 has a wall or shoulder 21 which the ring 16 abuts, and thus the ring 16 is axially fixed in both directions, and it is also snug and tight with the circumferential surface 22 of the bore 19.

The inner ring 17 extends within the opening of the outer ring 16, as shown, and it presents a circumferential lip 23 at one end of the ring 17, and the lip 23 is in snug contact with the outer circumference of the rod 11, and thus the lip 23 precludes dirt from passing beyond the inner ring 17 and into the cylinder 10. Further, the lip 23 has a surface of a significant axial length, indicated at 24, and this length extends along the length of the rod 11, and thus a substantial and significant area of contact is provided endlessly around the rod 11 by means of the circumferential lip 23 which is an endless lip on the inner ring 17. The inner ring 17 also has a surface 26 which is circumferential and which is spaced from the outer circumference of the rod 11, and thus a significant unit pressure is obtained between the ring 17 and the rod 11 by means of the area of the lip 23, as described.

The inner ring 17 is shown through a radially outer extending annular portion 27 to be in contact with the wall 21 and thus to be limited in its axial movement relative to the cylinder 10, and the portion or flange 27 is axially spaced from the end wall portion 28 of the outer ring 16, and thus there could be limited axial movement of the inner ring 17 relative to the fixed outer ring 16. Also, the outer circumferential surface 29 of the inner ring 17 is radially spaced from the circumferential surface 31 of the outer ring 16, and likewise the inner ring circumferential surface 32 is spaced from the outer ring inner circumferential surface 33. With the arrangement of the two radially spacings just described, the inner ring 17 can move radially relative to the outer ring 16, and thus the inner ring 17 moves in exact movement of the deflection of the rod 11, and thereby the ring wiper lip 23 remains in snug contact with the rod 11. Also, an elastic type of O-ring 34 is disposed between the rings 16 and 17, and FIG. 1 shows the O-ring 34 in a slightly compressed condition and thus there is a slightly springy or resilient positioning of the inner ring 17 to assure that it remains in snug contact with the rod 11. The outer ring 16 has an annular groove 36 in which the O-ring 34 is disposed, as shown.

With this arrangement, the wiper assembly 14 consists of the 3 pieces, namely, the 2 nested rings 16 and 17 with the interposed O-ring 34 of an elastic material, such as rubber. Thus, dirt cannot pass the lip 23, and also the O-ring 34 precludes dirt from moving past the compressed O-ring 34, and therefore the wiper assembly 14 prevents dirt from entering the cylinder 10, though it permits deflection of the rod 11, which is normal action of the piston rod such as the rod 11, while the inner ring 17 remains snug with the rod 11 in all positions of the rod 11. Further, with the arrangement described, the inner ring 17 is in the nature of a floating ring, and it may be made of a plastic material, such as nylon, or it may even be made of a metal material, such as steel or brass, and all materials will be suitable because of the arrangement and construction described.

FIG. 2 shows a left end view of the assembly shown in FIG. 1, and FIG. 3 shows a right end view of the inner ring 17 as it is shown in FIG. 1, and it will therefore be seen that the rings 16 and 17 and the O-ring 34 are annular and endless in their configurations.

FIG. 4 shows another embodiment of the wiper assembly, and it will here be noticed that the inner ring designated 37 has the configuration of the ring 17, except that the ring 37 has a larger flange portion designated 38, and this flange portion has its outer circumferential surface 39 spaced from the circumferential surface 22 of the bore 19. Further, the assembly in FIG. 4 has the outer ring 41 with an inner circumferential surface 42 which is spaced from the inner ring circumferential surface 32. With the two radial spacings mentioned, the inner ring 37 can move radially, to accommodate the deflection of the piston rod 11, as mentioned in connection with FIG. 1. Further, the outer ring 41 is provided with a groove 43 which confines the elastic O-ring 44 again extending between the 2 rings, as shown. Thus the O-ring 44 prevents the passage of dirt between the rings 37 and 41, and it also presents a slight resilient load from the fixed outer ring 41 to the floating and movable inner ring 37. Again, the inner ring 37 has its lip 23 in endless contact with the rod 11, and the ring 37 will float along with the deflection of the rod 11 and thereby prevent dirt from entering the cylinder 10. Also, the inner ring 37 is limited in its axial movement, by the end wall 21 of the bore 19 and by the end surface 46 of the outer ring 41.

FIG. 5 shows a right end view of the outer ring 41, and the O-ring 44 is also shown. With this arrangement, the O-ring 44 does not produce radial restriction on the movement of the inner ring 37, and therefore the ring 37 is completely free to move radially in response to the deflection of the rod 11.

In both embodiments, there is provided a complete unitary wiper assembly of the three parts, namely the two nested rings and the interposed elastomeric O-ring. Thus the wiper assembly can be readily and easily incorporated into the cylinder assembly shown and described, and no part of the cylinder itself is required in order to accommodate the wiper parts, since the outer ring 16 or 41 aligns the wiper assembly.

What is claimed is:

1. A rod floating wiper assembly comprising a housing member, a piston rod axially movably disposed in said housing member, said housing member having an annular opening encircling said piston rod, a first endless ring member fixedly disposed in said annular opening and being in snug contact with said housing member and encircling said piston rod and having a radially inner circumferential surface radially spaced from said piston rod, a second endless ring member disposed in said annular opening and being nested with said first ring member and being radially spaced from any contact with said first ring member and having a radially outer circumferential surface axially aligned with and radially spaced from said radially inner circumferential surface for radial movement of said second ring member toward and away from said first ring member, one of said ring members having an annular groove faced toward the other of said ring members, an elastomeric O-ring disposed in said annular groove between said ring members and being snug with each thereof for precluding the passage of dirt between and beyond said ring members while permitting relative radial movement therebetween, said second ring member having an inner circumferential surface extending along at least a part of the total axial length of said second rig member and disposed in endless snug contact with said piston rod for precluding the passage of dirt past said inner circumferential surface of said second ring member, and said second ring member being of a rigid material and spaced from said first ring member to move with and remain in endless snug contact with said piston rod upon deflection of said piston rod.

2. The rod floating wiper asembly as claimed in claim 1, wherein said ring members each have an end wall faced thereon axially of said rod and radially overlapping each other to limit axial movement of said second ring member relative to said first ring member.

3. The rod floating wiper assembly as claimed in claim 1, wherein said second ring member includes a radially outer projecting portion, and said first ring member and said housing member each have radially extending portions to be in face-to-face relation to each other and spaced apart and with one thereof on each axial side of said radially outer projecting portion for limiting axial movement of said second ring member.

4. The rod floating wiper assembly as claimed in claim 1, wherein said O-ring is disposed on and between the two spaced apart said circumferential surfaces, and said inner circumferential surface of said second ring member being of a length to extend for only less than the total axial length of said second ring member.

5. The rod floating wiper assembly as claimed in claim 1, wherein each of said ring members includes a surface extending radially of said rod and being spaced from the other in the direction of the axis of said rod, and said O-ring is disposed on and between said radially extending surfaces of said ring members.

* * * * *